United States Patent [19]

Cook

[11] 4,156,768

[45] May 29, 1979

[54] PROCESS FOR MAKING AND/OR MODIFYING POLYURETHANES

[75] Inventor: William H. Cook, Bloomfield Hills, Mich.

[73] Assignee: Kemerica, Inc., Bloomfield Hills, Mich.

[21] Appl. No.: 784,258

[22] Filed: Apr. 4, 1977

[51] Int. Cl.$^2$ .................... C08G 18/82; C08G 18/32; C08J 11/04
[52] U.S. Cl. ...................................... 528/46; 260/2.3; 528/492
[58] Field of Search ............ 260/2.3, 75 NA, 77.5 A, 260/77.5 SS; 528/46, 492

[56] References Cited

U.S. PATENT DOCUMENTS

| | | | |
|---|---|---|---|
| 2,917,471 | 12/1959 | Nelson | 260/2.3 |
| 3,117,940 | 1/1964 | McElroy | 260/2.3 |
| 3,192,185 | 6/1965 | Achterhof et al. | 260/77.5 AA |
| 3,404,103 | 10/1968 | Matsudaira et al. | 260/2.3 |
| 4,039,568 | 8/1977 | Sakai et al. | 260/2.3 |
| 4,046,741 | 9/1977 | Scher | 260/77.5 SS |

*Primary Examiner*—H. S. Cockeram
*Attorney, Agent, or Firm*—Gordon W. Hueschen

[57] ABSTRACT

Polyurethane resins of higher than desired molecular weight with or without gel fractions which comprise insoluble material due to crosslinking or excessive degree of polymerization are treated in the solid state with a liquid or gaseous primary or secondary amine under thermal conditions which cause aminolysis of both linear linkages and crosslinkages. By this procedure, the average molcular weights of the products can be reduced to acceptable levels. Also, if the product contains gel fractions, these too can be reduced to negligible levels. The procedure is applicable to both polyether and polyester urethanes and is effective to provide improved polymer characteristics for thermoplastic processing and solution applications.

25 Claims, No Drawings

PROCESS FOR MAKING AND/OR MODIFYING POLYURETHANES

BACKGROUND OF THE INVENTION
FIELD OF INVENTION

The invention relates to a process for treating polyurethanes, especially thermoplastically processable polyurethanes, to reduce the molecular weight thereof. More particularly, the invention is directed to processess for treating such polyurethanes as contain gel fractions, which comprise insoluble matter due to crosslinking, or excessive degree of polymerization, atypical polymermization, or like mechanisms, in order to eliminate or substantially reduce these gel fractions and/or to lower the molecular weight of the polymer.

Thermoplastically processable polyurethanes have been produced commercially for more than 20 years. The majority of products which are of industrial importance at the present are prepared by reaction of 4,4'-diphenylmethane diisocyanate with (1) an aliphatic polyesterdiol such as hydroxyl-terminated poly(1,4-butylene adipate) or an aliphatic polyetherdiol such as hydroxyl-terminated poly(oxytetramethylene) and (2) a diol chain extender such as 1,4-butanediol or 1,4-bis(2-hydroxyethoxy)benzene. Some of the commercially available polymers are predominantly hydroxyl-terminated, while others are prepared with a slight stoichiometric excess of isocyanate and are predominantly isocyanate-terminated. The latter polymers undergo further reaction upon elevated temperature post curing or aging in the presence of atmospheric moisture, and may become crosslinked. All of these polymers commonly are processed into shaped articles by means of thermoplastic processing techniques such as injection molding, extrusion, calendering, and blow molding. Many of the polymers, particularly those predominantly hydroxy)-terminated, are solube in dipolar aprotic solvents such as tetrahydrofuran, dimethylformamide, cyclohexanone and dioxane, and as solutions in these and other solvents, find a variety of applications as coatings and adhesives.

For applications in solution, it is highly desirable if not essential that under given conditions of temperature, concentration of polymer and choice of solvent, the viscosity be within certain limits. Moreover, when thin films or coatings are to be prepared from the solutions, it is important that the polymer be entirely soluble, i.e., free of particles of crosslinked polymer commonly called "gel". It is difficult to produce consistently thermoplastic polyurethanes which are free of gel. Furthermore, it is equally difficult to achieve precise molecular weight control, and therefore solution viscosity control, in commercial manufacture of the thermoplastics. In addition, even nominally OH-terminated thermoplastic polyurethanes generally contain a residuum of NCO groups sufficient to cause marked increases in molecular weight within normal periods of storage required in commercial applications prior to final usage of the thermoplastic. Of those products which have viscosity specifications, in many cases the dilute solution viscosity may vary as much as by a factor of two, and even with this generous allowance for variation of the molecular weight, a considerable amount of material is produced which is out-of-specification.

In many coatings and adhesives applications, it would be desirable to reproduce solution viscosity of a given type of polyurethane thermoplastic to within ± 20 percent, or even less, of a predetermined level without changing the temperature, polymer concentration, or composition of the solvent. Up to the present time, this has not been generally possible. Furthermore, many lots of material offering the desired viscosity characteristics are rejected due to gel content. Even for thermoplastic processing applications it is important to control molecular weight so as to provide suitable and uniform processing characteristics. Also, where thin articles are produced, as in blow molding, it is highly desirable to utilize polymers of low gel content. Nevertheless, it is typical to find a noticeable and objectionable amount of gel particles, for example, in blow-molded polyurethane film manufactured from in-specification lots of polymer.

Also, the storage stability of many polyurethane thermoplastics, both as solids and in solution, has been a problem. If free isocyanate is present in the polymer, it is inherently unstable and tends to increase in molecular weight. This is particularly troublesome when the polymer is exposed to moisture. When the polymer is to undergo thermoplastic processing, such aging leads to less favorable processing characteristics and physical properties in the articles produced. In the case of solution applications, the viscosity usually increases, the content of gel may increase, and/or the polymer may become less soluble.

OBJECTS OF THE INVENTION

It is an object of the invention to provide an improved process for modifying polyurethane polymers. It is a further object of the invention to provide a process for reducing the molecular weight of polyurethane polymers. It is a further object of the invention to provide a process for eliminating or reducing the amount of gel fractions in polyurethane polymers. It is a further object of the invention to provide a process for the recovery of off-grade polyurethane polymers. It is a further object of the invention to provide a process for upgrading polyurethane polymers. A still further object of the invention is to provide a process which obviates difficulties heretofore encountered in the prior art and which has advantages as will be more particularly pointed out as the description proceeds.

BRIEF DESCRIPTION OF THE INVENTION

The invention relates to a process for treating, in the solid state, polyurethane polymers, especially thermoplastically processable polyurethane polymers, of higher-than-desired molecular weight with a primary or secondary amine under conditions which cause aminolysis of both linear linkages and crosslinkages characteristic of the polyurethane being treated. Still more particularly, the invention relates to such a process which simultaneously effects reduction of gel fractions in the polyurethane polymer, which gel fractions comprise insoluble material due to crosslinking, excessive degree of polymerization, atypical polymerization, or like mechanisms.

While the invention is particularly applicable to thermoplastically processable polyurethanes, which term is to be understood to include those polyurethanes intended for solvent applications as well as for thermoforming, it is to be understood that it is broadly applicable to polyurethanes, including therosetting types, where it is desired to effect a reduction of the molecular weight either of the basic polymer per se, or of high molecular weight and/or insoluble inclusions due to crosslinking, excess degree of polymerization, atypical polymerization, and like mechanisms which may occur during manufacture and/or storage of the polyurethanes. The invention, for example, can be applied to rigid or micro-cellular foamed polyurethanes, especially where it is desired to alter the surface characteristics of such foams. With open cell type foams, the process can also be utilized to modify the general character of the foamed structure.

In carrying out the processes of the invention, the polyurethane polymer, in the solid state, is exposed to the primary or secondary amine under conditions effective to cause diffusion of the amine throughout the polymer, and then, simultaneously therewith, or, subsequently thereto, the amine-treated polymer is heated in the solid state for a time and at a temperature effective to cause the desired degree of aminolysis.

In both the diffusion and aminolysis portions of the process of the invention, substantial advantages are realized through treatment of the polymer in its solid state as opposed to treatment concomitant with dissolution of the polymer. In the presence of solvent, the amine is distributed among the solid and liquid phases and, as a result of the dilution factor, longer times and/or larger quantities of amine and/or higher temperatures during the aminolysis process may be required. Even when amine is first applied to the solid polymer and the diffusion process allowed to proceed to a satisfactory state of completion, upon addition of solvent to the amine-containing solid polyurethane, prior to aminolysis, some of the absorbed amine will diffuse back out of the polymer and into the liquid phase so as to reduce the amount of amine actually in contact with the polymer. Although a satisfactory result may be obtained through proper control of time/temperature variables during aminolysis together with use of relatively greater quantities of amine in many cases, there will generally be some disadvantage, such as greater overall process time requirements, if aminolysis is carried out concomitant with dissolution as opposed to being carried out in the absence of solvent.

Moreover, if the intended application of the treated polyurethane is thermoforming of the solid polymer as opposed to a solution application, it is a great disadvantage, if not entirely impractical, to have to recover the solid polymer from solution. In contrast, the process of the invention for solid state modification of polyurethanes generally involves only addition of the amine to the particulate solid polymer in a suitable closed container; allowing sufficient time for diffusion of the amine into and throughout the solid, which process may be hastened by moderate agitation or tumbling of the mixture together with heating to a temperature below that at which aminolysis proceeds at a substantial rate; and, after diffusion of the amine has occurred, heating for a requisite time and temperature sufficient to bring about aminolysis. If the amount of amine and the time and temperature conditions have been properly adjusted, the treated polymer will have a reduced average molecular weight of predetermined value, and will be essentially free of any gel inclusions which may have been present. If desired, the amine-treated polymer at the conclusion of the aminolysis heating cycle can be stripped under vacuum to remove any residual amine.

If the amine-treated polymer is to be used in a thermoforming operation, it is highly desirable to employ a brief vacuum stripping period following aminolysis so as to remove residual amine. Any residual amine could cause further aminolysis during thermoforming under the relatively high temperatures used in such operations. In addition, if the original polymer, prior to treatment with amine, contained objectionable amounts of gel inclusions with respect to its intended thermoforming application, it may be desirable, prior to thermoforming, to homogenize the amine-treated, vacuum stripped polymer by extrusion and pelletization or regrinding. This final processing step serves to dissolve in the continuous polymer phase any aminolyzed gel inclusions which, without such homogenization, might appear as inhomogenieties in the thermoformed end products. Homogenization is, of course, unnecessary if the amine-treated polyurethane is to be employed in dissolved form. In that case, the dissolution process provides complete homogenization.

In the process of the invention, the primary or secondary amine attacks such linkages as ester linkages, urethane linkages, allophanate linkages, and the like, which may be present in the polyurethane. It is effective in causing scission of these linkages whether they are linear linkages or cross-linkages. Through control of the amount of amine and of the time and temperature of the thermal treatment, the process can be tailor-made to achieve either controlled reduction of molecular weight or controlled reduction of molecular weight coupled with lowering or removing gel fractions contained in the polymer. Generally speaking, additional time for diffusion of the amine is required for the efficient breakdown of the gel fractions because it takes longer for the amine to diffuse into the suspended gel particles. Therefore, a longer time at a lower temperature, i.e., low enough so that substantial aminolysis does not take place prior to diffusion of amine throughout the gel, may be required than for simple reduction of molecular weight of gel-free material. In any case, the temperature should be low enough to prevent degradation of the resin by mechanisms other than scission of the aforementioned groups by the amine, as such other mechanisms may produce an off-color product or one not having the desired characteristics of thermoplasticity, elasticity, and the like.

In carrying out the process of the invention, the polyurethane polymer to be treated is exposed in the solid state to the primary or secondary amine under conditions of time and temperature effective to cause diffusion of the amine into the polymer and the amine-treated polyurethane polymer in the solid state thereafter is heated to a temperature effective to cause aminolysis for a time sufficient to accomplish the desired reduction in molecular weight. Advantageously, the solid polyurethane polymer is treated with the amine at a temperature below that at which substantial aminolysis takes place for a time sufficient to obtain effective diffusion of the amine into the polymer, including any gel fractions contained therein. The polymer may be heated to speed up this diffusion, advantageously, up to a temperature not greater than about 60° C. to promote diffusion of the amine into the polymer.

The amine-treated solid polymer then is heated in the solid state to a temperature sufficient to effect aminolysis and the temperature is maintained for a time sufficient to obtain the desired reduction in molecular weight and/or gel fractions. Ordinarily, this temperature can range from above about 60° C. to not more than about 120° C. Higher temperatures can be used, however, up to the temperature at which thermal degradation occurs at an objectionable rate. It is possible in some instances for diffusion and aminolysis to take place concomitantly, but generally it is desirable that diffusion be substantially complete before appreciable aminolysis is allowed to occur. The solid polyurethane polymer is exposed to the amine, preferably in a closed container, and heated therein in the presence of the amine for a time and at a temperature sufficient to effect the desired diffusion and aminolysis and the temperature maintained at aminolysis temperature for a time sufficient to obtain the desired reduction of molecular weight and/or gel fractions.

The amount of amine required to effect its purpose in the process of the invention is relatively small, and depends upon the particular amine used as well as upon other processing variables such as time and temperature variables. In general, there will be a residuum of unreacted amine in the treated polyurethane unless relative extremes of time and/or temperature are employed during the aminolysis phase of the process, or unless there is employed a subsequent processing step designed to remove or destroy such residuum of unreacted amine. Effective reduction in molecular weight, together with breakdown of any gel fractions present, ordinarily is obtained with less than 1 weight percent of amine, based on dibutylamine and the weight of the polymer. Higher amounts, up to 5 percent or even more can be used when there is substantial unreacted isocyanate present in the polymer and/or extensive crosslinking and/or when the conditions of aminolysis employed do not provide for substantially complete reaction of the amine. Also, it might be necessary to employ such higher amounts of amine if there were incomplete diffusion of amine prior to aminolysis. In such an instance, however, there would be extensive degradation (through aminolysis) of that portion of the polymer into which the amine had diffused prior to aminolysis, and the physical properties of the overall product, after treatment, generally would be seriously harmed. In any case, the equivalent of 5 percent of dibutylamine, if uniformly diffused prior to aminolysis and then completely reacted with the polymer, is sufficient to cause molecular weight reduction of most polymers beyond that consistent with preservation of normal polymer physical properties.

In general, it is not often necessary or desirable to exceed the equivalent of about 2 percent dibutylamine. The optimum amount for a given transformation under given processing conditions can be determined directly by experimentation. For each batch of off-grade polyurethane thermoplastic there is an experimentally determinable relationship between the amount of amine employed and the molecular weight (as conveniently observed in terms of solution viscosity) of the resulting treated polymer, other processing variables being held constant. The equivalent of 0.1 to 0.5 percent dibutylamine has been employed with complete success in the recovery of a wide variety of off-grade polyurethane thermoplastics, and even with such small amounts of amine there may be a residuum of unreacted amine in the polymer following successful recovery, unless such residuum is removed or otherwise eliminated. It is generally not necessary or desirable to employ less than the equivalent of about 0.01 percent dibutylamine. Where other amines are used, the proportions can be increased or decreased as necessary to account for higher or lower molecular weight and/or higher or lower aminolysis reactivity under given conditions relative to the molecular weight and reactivity of dibutylamine.

In carrying out the process of the invention, any basic primary or secondary amine, advantageously one having a $pK_b$ less than about 6, can be employed. The term amine as used herein is to be understood as referring to amines of this type. Suitable such secondary amines include dimethylamine, methylethylamine, diethylamine, ethylpropylamine, methylpropylamine, ethylisopropylamine, methylisopropylamine, dipropylamine, diisopropylamine, dibutylamine, diisobutylamine, methylbutylamine, ethylbutylamine, diamylamine, dihexylamine, diheptylamine, dioctylamine, di-2-ethylhexylamine, piperidine, tetrahydropyrrol, morpholine, N-methylethanolamine, diethanolamine, 2,6,-dimethylmorpholine, methylcyclohexylamine, dicyclohexylamine, methylbenzylamine, and dibenzylamine. Suitable such primary amines include methylamine, ethylamine, propylamine, isopropylamine, butylamine, isobutylamine, secbutylamine, amylamine, isoamylamine, hexylamine, heptylamine, octylamine, 2-ethylhexylamine, cyclohexylamine, benzylamine, 2-methoxyethylamine, 2-ethoxyethylamine, decylamine, dodecylamine, tridecylamine, ethanolamine, isopropanolamine, and 3-aminopropanol-1.

When the amines are liquid at ambient temperature, they can be absorbed on granules of the polymer and allowed to diffuse into the granules. Solid amines are encountered only infrequently in the practice of the invention, and generally offer no advantages over the variety of liquid and gaseous amines which are suitable and readily available. If a solid amine is to be used, it should be heated to above its melting point and absorbed on the polymer granules preheated to the same or higher temperature, provided that neither temperature is sufficiently high as to cause substantial aminolysis of the polymer prior to adequate diffusion of the amine throughout the polymer. Gaseous amines, such as methylamine, ethylamine and dimethylamine, can be employed in a closed system.

Often in the case of gaseous or solid amines, and sometimes with liquid amines, it is desirable to dissolve the amine in an inert diluent so as to facilitate measurement and handling of the amine and/or to improve uniform absorption and/or diffusion of the amine throughout the solid polyurethane. Suitable inert diluents include solvents which dissolve the particular amine in question and which may also tend to diffuse into the solid polymer, but not cause the polymer particles to agglomerate. Whether or not a given solvent/diluent for the amine is suitable depends in generally upon which polyurethane is being treated. Lower aromatic hydrocarbons such as benzene, toluene and the xylenes are generally suitable, as are lower alcohols such as isopropyl alcohol. Alcohols, of course, tend to diffuse into the polymer, and may complete with the amine, depending upon the relative amount of alcohol employed, for reaction with any residual isocyanate groups present in the polyurethane.

The amount of any diluent used may vary from much less than the amount of amine, such as ten percent of the weight of amine, to any larger amount. In general, it is not desirable to use more diluent than can be absorbed by the polymer, as any liquid phase remaining after absorption will contain some of the amine and therefore will reduce the amount of amine absorbed by the polymer and immediately available for aminolysis at the beginning of the aminolysis step. Furthermore, if the amine-treated polyurethane is to be used in thermoforming, it often will be necessary to remove the diluent anyway by means of vacuum stripping. Even when the polyurethane is to be dissolved following the amine treatment, an excessive amount of diluent may interfere with the dissolution process and/or have other deleterious effects in the course of the end use of the polyurethane solution.

Where it is an object to reduce the content of gel fractions, adequate diffusion of the amine into the polymer, including the gel fractions thereof, should be effected before applying heat sufficient to cause substantial aminolysis. Otherwise, non-uniform and overall inefficient action of the amine will result, and there will be some viscosity reduction accompanied by incomplete breakdown of the gel fractions.

In accordance with one form of the invention, the amine is added to the polymer in the granular form, preferably with at least some mechanical blending, and allowed to diffuse into the granules. For this purpose, amines which are non-solvents for the polyurethane polymer being treated are of particular advantage. When a non-solvent amine is used, the particles of the polymer do not agglomerate during the solid state treatment. The term "non-solvent amine" as used herein is to be understood to mean an amine which is a sufficiently poor solvent for the polyurethane polymer undergoing treatment that it is absorbed by the particles or granules without causing them to stick together. For the most part, such non-solvent amines are unsubstituted, higher molecular weight primary or secondary aliphatic and cycloaliphatic amines, for example, those having at least 7 carbon atoms, such as methylcyclohexylamine, dibutylamine, diamylamine, diisobutylamine, dihexylamine, dicyclohexylamine, dioctylamine, di-2-ethylhexylamine, heptylamine, octylamine, 2-ethylhexylamine, benzylamine, decylamine, dodecylamine, and tridecylamine, and advantageously containing not more than twelve carbon atoms.

A wide range of temperature variations may be used in carrying out the process of the invention because it is a time:temperature relation which is essentially important. Thus, during the diffusion of the amine into and throughout the solid polymer, any temperature below the aminolysis temperature, that is to say, the temperature at which substantial aminolysis takes place can be used and the higher the temperature the shorter will be the time necessary to effect the diffusion. The aminolysis temperature varies according to the reactivity of the particular amine. In general, however, aminolysis begins to proceed at a substantial rate at about 60° C., particularly with secondary amines, though with some of the more reactive primary amines, the aminolysis temperature may be somewhat lower. The upper temperature limit for the diffusion process generally is lower for primary amines than for secondary amines, as the primary amino group generally is the more reactive in aminolysis. In the aminolysis stage, or molecular weight reduction stage, any temperature above that at which substantial aminolysis takes place, but below that which would cause substantial thermal degradation of the polymer can be used, it being understood that the lower the temperature, the longer the time that will be required, and vice versa. In general, also, the shorter the time, the higher the temperature that can be used without excessive thermal degradation. Thus, in such case, the amine-treated granules in which the amine has been allowed or caused to diffuse throughout the polymer structure can be heated rapidly, preferably with concomitant tumbling of the granules, to a temperature up to 90° C., or higher, without deleteriously effecting color, strength, and elasticity of many polymers. In general, however, it is not desirable to employ temperatures above 120° C. Also, if adequate diffusion of the amine through the polymer granules was first obtained, then the product also is essentially free of gel fractions and clear, colorless, strong and elastic film can be drawn from the resulting product which, at the same time, has an acceptable molecular weight, from a starting polymer having a large amount of gel fractions and/or undesirably high molecular weight.

Alternatively, the amine-treated polymer is slowly and gradually heated over a considerable period before it is brought to the temperature at which aminolysis proceeds at a significant rate and then slowly and gradually heated up to a temperature substantially below that at which decomposition takes place, so that the mechanisms of diffusion and aminolysis are given adequate time to be accomplished.

It will be understood that, as the polyurethane polymer starting materials contemplated by the invention differ widely in constitution and gel fraction content, no hard and fast rules can be set down as to precise temperatures, times, selection of amines, and amounts of amines. It may be said, however, that a gradual increase in temperature or heating over longer periods at low temperatures promotes diffusion. Consequently, the mixture of polymer and secondary amine should be heated slowly over a considerable period of time and, at the same time, the maximum temperature should be kept relatively low, preferably below about 120° C.

The invention is applicable to both the polyester-type polyurethanes and polyether-type polyurethanes, as well as other types of polyurethanes, and conditions generally effective for one type are effective for the other types.

DETAILED DESCRIPTION OF THE INVENTION

The invention may be more fully understood by reference to the following examples which are given by way of illustration only. Parts and percentages are by weight unless otherwise specified.

EXAMPLE 1

An off-grade lot of intermediate hardness (87 Shore A) polyesterurethane granules (Estane 5701 F1) was obtained from B. F. Goodrich Chemical Company. This material was high in molecular weight and contained a substantial amount of gel.

PART 1A

To a 100 g portion of Estane 5701 F1 of this example in a one pint can was added 0.5 ml dibutylamine. The can was closed, shaken and set aside at room temperature for 10 days. Then it was placed in an oven at 73° C. for 20 hours. There was no sticking together of the granules upon opening the hot can. The granules were transferred to a larger can and 300 g cyclohexanone was added and the mixture was stirred at high speed with an air-powered mixer. After 90 minutes, dissolution appeared complete, but the viscosity was high. A portion of the solution was diluted with cyclohexanone to 19.5 percent NVS. After standing overnight, the viscosity of the 25 percent solution at 25° C. was 29,760 cps, and that of the 19.6 percent solution at 25° C. was 1,220 cps.

A film prepared from this solution was free of gel particles.

PART 1B

A 300 g portion of the Estane 5701 F1 of this example was weighed into a one quart can and 1.5 ml dibutylamine was added. The can was closed and rolled for 20 minutes and set aside at room temperature for three days. Then it was rolled again for 15 minutes and placed in an oven at 180° F. for 19 hours. It was again rolled for 10 minutes, and 60 g of the granules was transferred to a one quart can. Tetrahydrofuran (340 g) was added to make 15 percent NVS. The can was closed and put on an electric roller for 90 minutes. The solids had dissolved, and the viscosity of the solution at room temperature was 370 cps.

EXAMPLE 2

A 50 pound lot of off-grade polyetherurethane thermoplastic of 80 Shore a hardness was obtained from B. F Goodrich Chemical Company. This material, Estane 5714 F1, was not within normal product specifications due to its high solution viscosity and gel content. The viscosity specification for this product is 600–1,200 cps at 15 percent NVS in tetrahydrofuran at 25° C.

A 300 g portion of this lot of Estane 5714 F1 was weighed into a one quart can and 1.5 ml dibutylamine was added. The can was closed and rolled on an electric roller for 30 minutes. There was no sticking together of the granules before or after rolling and the can was closed and heated in an oven at 85° C. for 18 hours. The oven temperature then was increased to 100° C. for three hours, and the can was removed and rolled immediately for 15 minutes. There was little if any tendency for the granules to stick together while hot. Forty-five g of the granules then was transferred to a one pint can and 255 g tetrahydrofuran was added (for 15 percent NVS). This solution was stirred at room temperature to dissolve the granules, and additional tetrahydrofuran was added to compensate for evaporation losses. The granules dissolved completely, and the viscosity of the solution at 25° C. was found to be 285 cps.

EXAMPLE 3

A 50 pound lot of hard (50 Shore D) thermoplastic polyesterurethane granules (Estane 5707) was obtained from B. F. Goodrich Chemical Company. This particular lot was rated "off-grade" by the manuacturer due to its high solution viscosity in dimethylformamide (3,048 cps at 15 percent non-volatile solids by weight [NVS] at 25° C.) and to the significant amount of loosely cross-linked gel which is contained. The standard viscosity specification for this product is 670–1,290 cps at 15 percent NVS in dimethylformamide at 25° C.

Two hundred g of the Estane 5707 of this example was weighed into a one pint can and 2.0 ml dibutylamine was added. The can was closed and shaken intermittently for 20 minutes and then was placed in an oven at 110° C. for 18 hours. Forty-five g of the granules was then weighed into a one pint can and 225 g dimethylformamide (for 15 percent NVS) was added. The mixture was stirred at low speed for 30 minutes, during which time the granules dissolved completely and the solution did not rise above room temperature. The viscosity was determined to be 52 cps. This shows that, when desired, a viscosity which is far below the manufacturer's specification of 670–1,290 cps can be obtained.

By using a smaller amount of dibutylamine and/or lower oven temperature and/or shorter heating time, this polyester-urethane, originally of high gel content and 3,048 cps viscosity under the above measurement conditions, can be brought to a viscosity within the manufacturer's specification.

EXAMPLE 4

A 50-pound lot of relatively soft (74 Shore A) thermoplastic polyesterurethane granules (Estane 5710) was obtained from B. F. Goodrich Chemical Company. This sample was from a lot rated "off-grade" by the manufacturer due to its high solution viscosity in tetrahydrofuran (1,900 cps at 15 percent NVS and 25° C.). The standard viscosity specification for this product is 400–800 cps at 25° C. and 15 percent NVS in tetrahydrofuran. This sample was rated by the manufacturer as having "no gel present". However, the method of gel rating used evidently reflects the degree of gel control which it has been possible to achieve in commercial production up to the present time. The much more sensitive film examination procedure described herein reveals that this sample of Estane 5710 in fact contains a large amount of small gel particles, which produce dozens of imperfections per square inch in films prepared from solutions of the untreated thermoplastic.

Following the procedure of Example 3, the Estane 5710 of this example was treated with dibutylamine in the solid state at elevated temperature. At 15 percent NVS in tetrahydrofuran, in which the product dissolved completely, the viscosity at 25° C. was 32 cps.

As in Example 3, by using a smaller relative amount of dibutylamine, lower oven temperature and/or shorter heating period, this polyesterurethane can be brought to a viscosity with the standard viscosity specification of 400–800 cps under the above measurement conditions.

EXAMPLE 5

Two hundred g of the granulated polyesterurethane thermoplastic of Example 1 was charged to a one-pint paint can and 0.5 ml of a 71.6% aqueous solution of ethylamine was added from a syringe. The amine solution caused no immediate sticking of the granules, and the can was closed promptly to avoid evaporation losses and shaken for about 30 seconds to distribute the amine. After standing overnight at room temperature, the can was placed in an oven at 93° C. and maintained at 93–95° C. for 22 hours. The can then was removed from the oven and shaken while hot. There was no sticking together of the hot granules. Upon opening the hot can, there was a very weak odor of the amine present. The open can was immediately placed in a vacuum chamber and evacuated to 1 mm Hg for 15 minutes. Upon removal from the vacuum chamber, there was no residual odor of amine emanating from the still-warm granules. After standing at room temperature for two days, 30 g of the granules was dissolved in 170 g tetrahydrofuran with stirring at room temperature. It was noted that the amine-treated granules dissolved without swelling, while in a parallel experiment with untreated granules there was extensive swelling during dissolution. The control solution (15% NVS) of untreated granules had a viscosity at 18° C. of 1,860 cps, which clearly is far above the manufacturer's specification of 300–700 cps at 25° C. The 15% NVS solution of treated granules had a viscosity at 18° C. of 155 cps, which, although below the specification, illustrates the effectiveness of ethylamine in reducing the polymer molecular weight.

EXAMPLE 6

To 200 g of the granulated thermoplastic polyurethane of Example 5 in a one-pint paint can was added 0.8 g of monoisopropanolamine dissolved in 4 g isopropyl alcohol. The can was closed and shaken to distribute the liquid. After standing for two days at room temperature, the can was shaken again; there was no sticking together of the granules. The can then was placed in an oven at 102° C. for 21 hours, then removed and set aside at room temperature. After standing overnight, the can was opened, and the granules were found to have become fused together in one lump. A 45 g portion of the fused lump then was cut into small pieces and dissolved in 255 g tetrahydrofuran at room temperature. The viscosity of this 15% NVS solution at 16.5° C. was 55.2 cps. A 35% NVS solution of the treated granules in dimethylformamide also was prepared and was found to have a viscosity of 6,180 cps at 16° C. These results illustrate the effectiveness of monoisopropanolamine in isopropyl alcohol for reducing the molecular weight of the polyurethane, although the amount of reagent used was more than that needed to reduce the molecular weight to within the manufacturer's specifications.

EXAMPLE 7

In the manner of Example 3, 200 g of the granulated polyurethane thermoplastic of Example 4 was treated with 0.8 ml of n-octylamine. The temperature of the oven, however, was 92°–95° C. The viscosity of a 15% NVS solution of the treated granules in tetrahydrofuran at 21° C. was 640 cps, which is clearly within the manufacturer's specification of 400–800 cps at 25° C.

EXAMPLE 8

To 200 g of the granulated polyurethane thermoplastic of Example 2 in a one-pint can was added 1.0 ml of a solution prepared by dissolving 10 g gaseous methylamine in benzene so as to make 100 ml of the stock solution. The can was closed immediately, shaken for 30 seconds, and then placed in an oven at 85° C. for 18 hours. The can then was removed from the oven and allowed to cool to room temperature. It was opened, and the odor of benzene together with a faint odor of methylamine was noted. The open can was placed in a vacuum chamber at 1 mm Hg for 15 minutes, and then examined. The vacuum stripping had removed both the ordor of benzene and of methylamine. A portion of the granulate then was dissolved in tetrahydrofuran at room temperature so as to make a 15% NVS solution. The viscosity of this solution at 24° C. was found to be 720 cps, within the manufacturer's specification of 600–1,200 cps at 25° C.

It is to be understood that the invention is not to be limited to the exact details of operation or structure shown and described, as obvious modifications and equivalents will be apparent to one skilled in the art.

I claim:

1. A process for treating polyurethanes of higher than desired molecular weight to reduce the molecular weight thereof which comprises treating the polyurethane exclusively in the solid state with a basic primary or secondary amine under conditions which cause scission of polymer linkages exclusively by solid-state aminolysis to produce a polyurethane having a lower average molecular weight than the starting polyurethane.

2. The process of claim 1, in which the amine is admixed within the polyurethane in a solid particulate state.

3. A process for treating polyurethanes of higher than desired molecular weight to reduce the molecular weight thereof, which comprises treating the polyurethane exclusively in the solid state with a basic primary or secondary amine under conditions which cause scission of polymer linkages exclusively by aminolysis to produce a polyurethane having a lower average molecular weight than the starting polyurethane, in which the amine is admixed with the polyurethane in a solid particulate state, and in which the admixture is first heated below the temperature at which substantial aminolysis takes place in order to promote diffusion of the amine into the polyurethane and, thereafter, above the temperature at which aminolysis takes place in order to promote scission of polyurethane linkages by aminolysis.

4. The process of claim 3, in which the admixture is first heated to a temperature not greater than about 60° C. and, thereafter, at a temperature sufficiently greater than in the first step so as to promote aminolysis but not substantially greater than about 120° C.

5. The process of claim 4, in which the amine is an aliphatic or cycloaliphatic hydrocarbon amine having at least 7 carbon atoms and not more than 12 carbon atoms.

6. The process of claim 5, in which the amine is dibutylamine.

7. The process of claim 6, in which the amount of amine is between about 0.01 and 10 percent based on the weight of the polyurethane.

8. The process of claim 5, in which the amount of amine is between about 0.01 and 10 percent based on the weight of the polyurethane.

9. A process for treating polyurethanes of higher than desired molecular weight to reduce the molecular weight thereof, which comprises treating the polyurethane exclusively in the solid state with a basic primary or secondary amine under conditions which cause scission of polymer linkages exclusively by aminolysis to produce a polyurethane having a lower average molecular weight than the starting polyurethane, and in which the polyurethane in the solid state is heated in the presence of the amine in two stages; first, at a temperature below that at which appreciable aminolysis takes place until substantial diffusion of the amine into and throughout the solid polyurethane is obtained and, second, at a temperature sufficient to promote aminolysis, but insufficient to cause thermal degradation.

10. The process of claim 9, in which the temperature in the first stage is not greater than about 60° C. and in the second stage is greater than that in the first stage, but not substantially greater than about 120° C.

11. The process of claim 10, in which the amine is an alipathic or cycloaliphatic hydrocarbon amine having at least 7 carbon atoms and not more than 12 carbon atoms.

12. The process of claim 11, in which the amine is dibutylamine.

13. The process of claim 12, in which the amount of amine is between about 0.01 and 10 percent based on the weight of the polyurethane.

14. The process of claim 11, in which the amount of amine is between about 0.01 and 10 percent based on the weight of the polyurethane.

15. A process for treating polyurethanes of higher than desired molecular weight to reduce the molecular weight thereof, which comprises treating the polyurethane exclusively in the solid state with a basic primary or secondary amine under conditions which cause scission of polymer linkages exclusively by aminolysis to produce a polyurethane having a lower average molecular weight than the starting polyurethane, and in which the amount of amine is between about 0.01 and 10 percent based on the weight of the polyurethane.

16. A process for treating thermoplastic polyurethanes of higher than desired molecular weight which contain dispersed therein gel particles for the purpose of reducing the molecular weight and the content of such gel particles which comprises treating the polyurethane exclusively in the solid state and exclusively by aminolysis with a basic primary or secondary amine under conditions which cause scission of both linear linkages and crosslinkages characteristic of the polyurethane being treated 17. The process of claim 16, in which the solid state polyurethane is treated in the presence of the amine in two stages; first, at a temperature below that at which appreciable aminolysis takes place until substantial diffusion of the amine into and throughout the solid polyurethane is obtained and, second, at a temperature sufficient to promote aminolysis, but insufficient to cause substantial thermal degradation.

18. The process of claim 17, in which the temperature in the first stage is not greater than about 60° C., and that in the second stage is greater than that in the first stage, but not substantially greater than about 120° C.

19. The process of claim 18, in which the amine is an aliphatic or cycloaliphatic hydrocarbon amine having at least 7 carbon atoms and not more than 12 carbon atoms.

20. The process of claim 19, in which the amine is dibutylamine.

21. The process of claim 20, in which the amount of amine is between about 0.01 and 10 percent based on the weight of the polyurethane.

22. The process of claim 16, in which the amount of amine is between about 0.01 and 10 percent based on the weight of the polyurethane.

23. A polyurethane composition comprising polyurethane molecules obtained by scission of a urethane or ester linkage exclusively by solid-state aminolysis with a basic primary or secondary amine.

24. A polyurethane composition comprising polyurethane molecules obtained by scission of a urethane or ester linkage exclusively by solid-state aminolysis with an aliphatic or cycloaliphatic hydrocarbon amine having at least 7 carbon atoms and not more than 12 carbon atoms.

25. A polyurethane composition comprising polyurethane molecules obtained by scission of a urethane or ester linkage exclusively by aminolysis with dibutylamine.

* * * * *

UNITED STATES PATENT AND TRADEMARK OFFICE
CERTIFICATE OF CORRECTION

PATENT NO. : 4,156,768

DATED : May 29, 1979

INVENTOR(S) : William H. Cook

It is certified that error appears in the above-identified patent and that said Letters Patent are hereby corrected as shown below:

[57] ABSTRACT, line 8; "molcular" should read -- molecular --
Col. 1, lines 11 & 12; "processsess" should read -- processes --
Col. 1, line 16; "polymermization" should read -- polymerization --
Col. 1, line 39; "hydroxy)-" should read -- hydroxyl- --
Col. 1, line 39; "solube" should read -- soluble --
Col. 2, line 67; "theromsetting" should read -- thermosetting --
Col. 6, line 51; "generally" should read -- general --
Col. 6, line 56; "complete" should read -- compete --
Col. 9, line 20; "a" should read -- A --
Col. 11, line 59; "structure" should read -- structures --
Col. 12, line 4; "within" should read -- with --
Col. 12, line 58; "alipathic" should read -- aliphatic --
Col. 13, line 20, (the end of Claim 16); "treated" should have a -- . -- after it.

Signed and Sealed this

Eleventh Day of September 1979

[SEAL]

Attest:

LUTRELLE F. PARKER

Attesting Officer  Acting Commissioner of Patents and Trademarks